(12) United States Patent
Chmora et al.

(10) Patent No.: US 7,802,105 B2
(45) Date of Patent: Sep. 21, 2010

(54) METHOD AND APPARATUS FOR GENERATING CRYPTOGRAPHIC KEY USING BIOMETRIC DATA

(75) Inventors: Andrey L. Chmora, Moscow (RU); Alexei V. Ourivski, Ozery (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 1324 days.

(21) Appl. No.: 11/126,393

(22) Filed: May 11, 2005

(65) Prior Publication Data
US 2010/0014655 A1    Jan. 21, 2010

(30) Foreign Application Priority Data
May 12, 2004    (RU) ............... 2004114316
Mar. 26, 2005    (KR) ............ 10-2005-0025211

(51) Int. Cl.
G06F 21/00    (2006.01)
H04L 9/14    (2006.01)

(52) U.S. Cl. ........................... 713/186; 380/44
(58) Field of Classification Search ............... 713/161, 713/168, 182, 186; 726/2–5, 16–18, 26–28; 380/28–30
See application file for complete search history.

(56) References Cited

U.S. PATENT DOCUMENTS

| | | | | |
|---|---|---|---|---|
| 5,708,712 | A * | 1/1998 | Brinkmeyer et al. | 713/181 |
| 6,038,315 | A * | 3/2000 | Strait et al. | 713/183 |
| 6,219,794 | B1 * | 4/2001 | Soutar et al. | 726/18 |
| 7,219,368 | B2 * | 5/2007 | Juels et al. | 726/2 |
| 7,269,277 | B2 * | 9/2007 | Davida et al. | 382/117 |
| 2002/0070844 | A1 * | 6/2002 | Davida et al. | 340/5.53 |
| 2003/0097559 | A1 * | 5/2003 | Shimizu et al. | 713/155 |
| 2003/0219121 | A1 * | 11/2003 | van Someren | 380/44 |

OTHER PUBLICATIONS

R. Anderson. Security Engineering: A Guide to Building Dependable Distributed Systems, Chapter 13. John Wiley & Sons, Inc. 2001.
Colin Soutar, et al., "Biometric Encryption™ using image processing," Proc. SPIE 3314, 178-188, (1998).
Colin Soutar, et al., "Biometric Encryption™—Enrollment and Verification Procedures," Proc. SPIE 3386, 24-35, (1998).
Colin Soutar, et al., "Biometrics and Digital Keys." (Sep. 2003).
Colin Soutar, et al., Biometric Encryption™, published as chapter 22 in ICSA Guide to Cryptography, edited by Randall K. Nichols, McGraw-Hill (1999).

* cited by examiner

Primary Examiner—Gilberto Barron, Jr.
Assistant Examiner—Abdulhakim Nobahar
(74) Attorney, Agent, or Firm—NSIP Law

(57) ABSTRACT

A method of securely storing and authenticating biometric data against attacks of a third party includes encoding input biometric data, and applying a one-way function to the encoded biometric data. A first exclusive OR operation is performed to the result of the one-way function and a selected secret key. The result of the first exclusive OR operation is encoded, and a second exclusive OR operation is performed to the encoded result of the first exclusive OR operation and the encoded biometric data. The result of the second exclusive OR operation is stored. In the same manner, the biometric data is authenticated. Accordingly, the biometric data can be securely stored against the attacks of a third party by processing and storing the biometric data according to a predetermined procedure.

14 Claims, 3 Drawing Sheets

METHOD AND APPARATUS FOR GENERATING CRYPTOGRAPHIC KEY USING BIOMETRIC DATA

CROSS-REFERENCE TO RELATED APPLICATIONS

This application claims the benefit of Russian Patent Application No. 2004114316, filed on May 12, 2004 in the Russian Patent Office, and Korean Patent Application No. 2005-25211, filed on Mar. 26, 2005 in the Korean Intellectual Property Office, the disclosures of which are incorporated herein by reference in their entirety.

BACKGROUND OF THE INVENTION

1. Field of the Invention

The present invention relates generally to biometric authentication using biometric data. More particularly, the present invention relates to a method for performing biometric authentication without exposing biometric data to a third person.

2. Description of the Related Art

Biometric authentication is an authentication process that extracts biometric data of a person and treats the extracted information for use in authentication of the person. The biometric authentication process utilizes distinctive characteristics of a person, such as fingerprints, voice, iris and the like, as a password. Physical and behavioral features of a personal are measured by an automatic device and the measured features are utilized as a mechanism for personal identification. Typically, the biometric authentication process is classified into two applications. In the first application, the physical features of fingerprints, facial contours, iris, and vein are used. In the second application, behavioral features of voice pattern and signature are used.

The physical features including facial contours, voice waves, fingerprints, and eye's iris, are protected against malicious use or piratical duplicate and are not prone to change or loss, like a key or password. Thus, the physical features are applied to security fields. Especially, the physical features can be traced for a user and can implement a secure system in view of its management.

Among the biometric authentication methods, a palm scan authentication method was the first to be automated. Finger patterns of thousands of people are analyzed and treated as data based on the observation that each person has different lengths of the fingers. Alternatively, the lines in the palm of the hand are analyzed and treated as data since the lines in the palm are unique pattern for each person.

Fingerprints, which are generated on the dermis under the epidermis of the skin, do not change during the lifetime unless the dermis is damaged. Thus, the finger scan has been prevalently used for the personal identification. The principle of the finger scan is to extract features of finger images, such as ridges or ridge endings, and to compare the extracted features with the stored original data.

Vein recognition detects vein patterns on the back of the hand or the wrist to identify a person by scanning the vein using infrared rays and using the captured images. As it is infeasible to duplicate the vein patterns, the vein recognition guarantees a high-level of security. However, the hardware requires complex configuration and the utilization range is restricted due to the great expense relating to the entire system.

Iris scan takes advantage of unique iris patterns of the eye, and is the most advanced security system in view of data correctness, stability, ease of use, and data processing speed, when comparing with the finger scan or the retina scan. The iris acquires its unique pattern in one or two years after birth and the pattern is constant. The iris pattern is scanned 8~25 cm off from the iris using an auto-focusing camera, which is a non-contact method. Thus, the iris scan does not cause awkwardness to the user and can identify a person within 2 seconds. In short, the iris scan is the more highly advanced biometric authentication.

Voice recognition is based on a property that the individual has a unique voice pitch patterns according to its accent and speech habit. The voice recognition analyzes features of the voice transferred through a telephone or a microphone and retrieves the most similar result. Unlike the other biometric authentication methods, the voice recognition can be used to identify a person from a distance using a telephone, and does not require special education relating to how to use the voice recognition. Also, the voice recognition features low-cost system. However, if a user has a hoarse voice from cold or the like, the voice recognition may not work well. Further, the voice recognition may not work well in situations when a third person imitates another's voice or where the environment in which the voice is recorded has a lot of noise.

Facial recognition can easily identify the individual using a camera without having to contact a device. A face database is configured and an input facial image is compared with face images stored in the database. However, facial expression varies depending on the individual's mood and is affected by ambient lighting.

As mentioned above, the biometric data can be used for the user authentication without the use of a password. FIG. 1 depicts a construction of an authentication section that performs the biometric authentication by use of the conventional biometric data. The authentication section includes a features extractor 100, a comparator 102, a database 104, and a controller 106. It should be understood that the authentication section can include other components in addition to the above-mentioned components.

The feature extractor 100 receives biometric data of a user. The feature extractor 100 receives the user's biometric data such as fingerprints, iris, and the like, to be authenticated. The feature extractor 100 extracts only the features required for the biometric authentication from the received biometric data. Specifically, the feature extractor 100 extracts only the required data from the received biometric data and uses the extracted data for the sake of the biometric authentication. Thus, the feature extractor 100 can reduce the volume of data to be delivered. The data extracted at the feature extractor 100 is not explained in detail for brevity, but is generally known. The extracted data is transferred to the comparator 102.

The database 104 stores data relating to users who are allowed access to a system or location, or are otherwise deemed authorized. The database 104 stores the data extracted at the feature extractor 100 among the biometric data of the users who are allowed to access or authorized. As discussed above, the database 104 stores the minimum data required for the authentication to reduce the volume of the stored data.

The comparator 102 compares the data fed from the feature extractor 100 with the data stored in the database 104, to thus carry out the biometric authentication. If the data from the feature extractor 100 is stored in the database 104, the user of the provided biometric data is allowed to access. The controller 106 controls the components of the authentication section. The controller 106 issues a control command to control the operations of the features extractor 100, the database 104, and the comparator 102.

In light of the background as above, the authentication section includes the database 104 that stores the conventional biometric data of the users who are allowed to use or authorized. Accordingly, in the event that the database 104 is attacked or accessed by a third party who is not authorized such access, the authentication system is subjected to serious risk. In addition, the third party may abuse the obtained biometric data.

SUMMARY OF THE INVENTION

An aspect of the present invention has been provided to solve the above-mentioned and/or other problems and disadvantages and an aspect of the present invention provides a method for securely storing and verifying biometric data so as to be secure against an attack by a third party.

Additional aspects and/or advantages of the invention will be set forth in part in the description which follows and, in part, will be obvious from the description, or may be learned by practice of the invention.

According to an aspect of the present invention, a method of storing biometric data includes encoding input biometric data and calculating a value of a one-way operation with respect to the encoded biometric data; applying a first exclusive OR operation to the calculated result of the one-way function and a selected secret key; encoding the result of the first exclusive OR operation and applying a second exclusive OR operation to the encoded result of the first exclusive OR operation and the encoded biometric data; and storing the result of the second exclusive OR operation.

In accordance with a further aspect of the present invention, an apparatus for storing biometric data includes a biometric encoder for encoding biometric data; a one-way function operator for calculating a value of a one-way function operation with respect to the encoded biometric data; a first exclusive OR calculator for performing an exclusive OR operation with respect to the calculated value of the one-way function and a selected secret key; an error correction code (ECC) encoder for encoding the result of the exclusive OR operation; a second exclusive OR calculator for performing an exclusive OR operation with respect to the encoded result of the exclusive OR operation and the encoded biometric data; and a database for storing the result of the exclusive OR operation.

In accordance with a yet another aspect of the present invention, an apparatus for verifying biometric data includes a biometric encoder for encoding biometric data; a first exclusive OR calculator for performing an exclusive OR operation with respect to the encoded biometric data and stored data; a second exclusive OR calculator for performing an exclusive OR operation with respect to the stored data and the result of the first exclusive OR operation; an error correction code (ECC) decoder for decoding the result of the first exclusive OR operation; a one-way function operator for applying a one-way function to the result of the second exclusive OR operation; a third exclusive OR calculator for performing an exclusive OR operation with respect to the result of the one-way function received from the one-way function operator and the decoded value from the ECC decoder; and a comparator for comparing whether the output value of the third exclusive OR calculator and a stored secret key do match.

In accordance with a still another aspect of the present invention, a method of verifying biometric data includes encoding biometric data; performing a first exclusive OR operation with respect to the encoded biometric data and stored data; performing a second exclusive OR operation with respect to the stored data and the result of the first exclusive OR operation; decoding the result of the first exclusive OR operation; applying a one-way function to the result of the second exclusive OR operation; performing a third exclusive OR operation with respect to the result of the one-way function and the decoded value; and comparing whether the result of the third exclusive OR operation and a stored secret key do match.

BRIEF DESCRIPTION OF THE DRAWINGS

These and/or other aspects and advantages of the invention will become apparent and more readily appreciated from the following description of exemplary embodiments of the present invention, taken in conjunction with the accompanying figures of which.

DETAILED DESCRIPTION OF THE EMBODIMENTS

Figure 1:
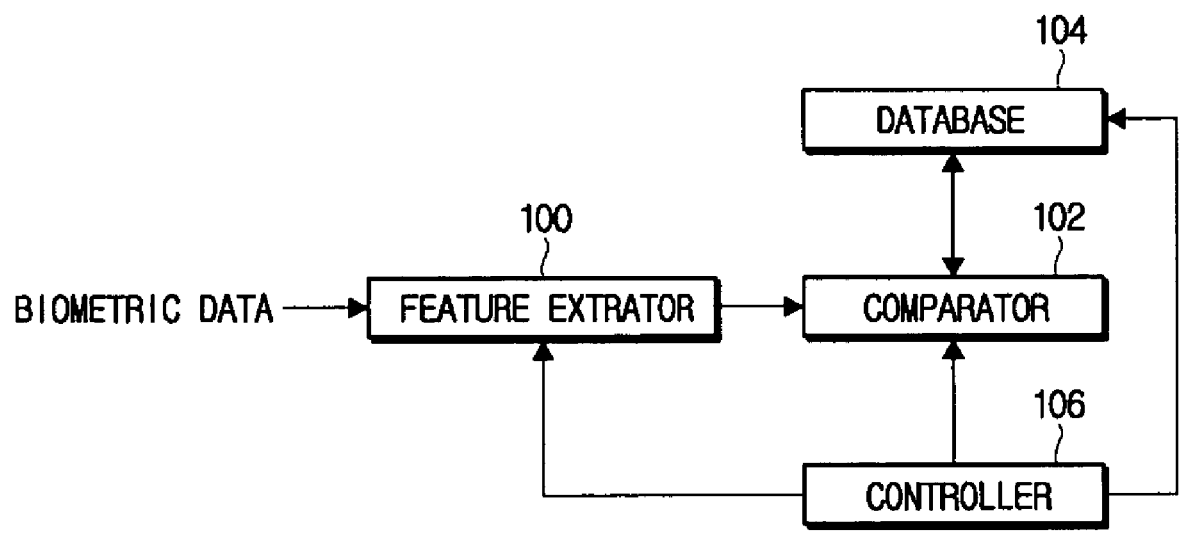
FIG. 1 is a block diagram of an authentication section that performs biometric authentication using conventional biometric data.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 2:
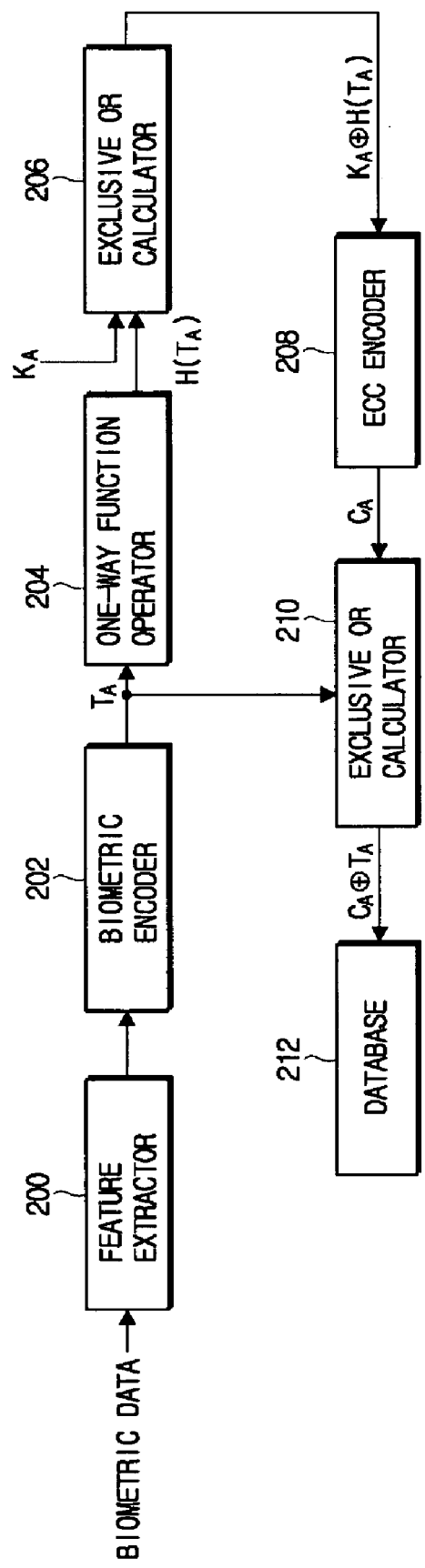
FIG. 2 is a block diagram explaining how a cryptographic key is generated using provided biometric data according to an embodiment of the present invention.

Aspects of the present invention propose a method of processing and storing biometric data of a user according to a predefined procedure. FIG. 2 illustrates a system which stores biometric data in a database 212 for use in authentication according to an embodiment of the present invention. As shown in FIG. 2, the system includes a feature extractor 200, a biometric encoder 202, a one-way function operator 204, an exclusive OR calculator 206, an error correction code (ECC) encoder 208, an exclusive OR calculator 210, and a database 212. It is to be understood that other components may be included to store biometric data, but only necessary components for the example shown in FIG. 2 are illustrated in FIG. 2 to facilitate the understanding of the present invention. However, it is understood that elements of FIG. 2 can be removed and/or combined according to other aspects of the invention. For instance, the feature extractor 202 can be remotely located and/or the extracted biometric data and be supplied across a network or as files on a computer readable medium. Further, if the extracted biometric and/or the biometric data are supplied in digitized form, the biometric encoder 202 need not be included or need only compress/decompress the supplied data.

The feature extractor 200 receives biometric data of a user. In specific, the feature extractor 200 receives the biometric data of the user, such as fingerprints, iris, and the like and which has been detected using an appropriate detector. The features extractor 200 extracts only necessary features required for the biometric authentication, from the received biometric data. The biometric encoder 202 encodes the received biometric data. Specifically, the biometric encoder 202 encodes the received biometric data to digital data.

In FIG. 2, $T_A$ is the encoded biometric data output from the biometric encoder 202. The biometric encoder 202 provides the encoded biometric data to the one-way function operator 204 and the exclusive OR calculator 210. The one-way function operator 204 applies a one-way function to the encoded biometric data being received, and outputs the result $H(T_A)$. The one-way function can obtain $H(T_A)$ from $T_A$, but cannot obtain $T_A$ from $H(T_A)$. It is understood that the one way function can be a trapdoor or a non-trapdoor one way function.

The exclusive OR calculator 206 performs the exclusive OR operation to the received $H(T_A)$ and $K_A \cdot K_A$, which is a secret key, is generated at a secret key generator (not shown) or is randomly selected from secret keys stored in a secret key storage (not shown). If bit lengths of $H(T_A)$ and $K_A$ input to the exclusive OR calculator 206 do not match, the bit lengths are matched first. The bit lengths can be matched by padding a predetermined value to the shorter bit length or by subtracting a predetermined value from the longer bit length. Note that the bit lengths of the provided data may be matched according to other methods. The exclusive OR calculator 206 outputs $K_A \oplus H(T_A)$ to the ECC encoder 208.

The ECC encoder 208 encodes the received $K_A \oplus H(T_A)$. The ECC encoder 208 outputs the encoded data as $C_A$. The ECC process allows the detection and/or correction of an error from the input data (i.e., $K_A \oplus H(T_A)$) by adding a fixed amount of redundancy. Examples of the ECC include, but are not limited to, BCH code, Turbo code, Viterbi code, and the like. However, it is understood that the ECC encoder 208 need not be used in all aspects of the invention, and that the encoder 208 could use other types of encoding.

The exclusive OR calculator 210 performs the exclusive OR operation to the $T_A$ received from the biometric encoder 202 and the $C_A$ received from the ECC encoder 208. In result, the exclusive OR calculator 210 outputs $C_A \oplus T_A$. The database 212 stores the $C_A \oplus T_A$ output from the exclusive OR calculator 210. By repeating the above operation, the database 212 stores the biometric data corresponding to each of a plurality of users. It is understood that the database 212 can be remotely located on a medium outside of the shown system and supply the stored data to the system across a network. It is further understood that the database 212 can be stored using media of different types, including, but not limited to magnetic and/or optical type media.

The biometric data stored in the database 212 has been processed according to a predetermined procedure. Thus, even if a third party obtains the biometric data that is processed according to the predetermined procedure and stored in the database 212, it is impossible to acquire the required biometric data.

Figure 3:
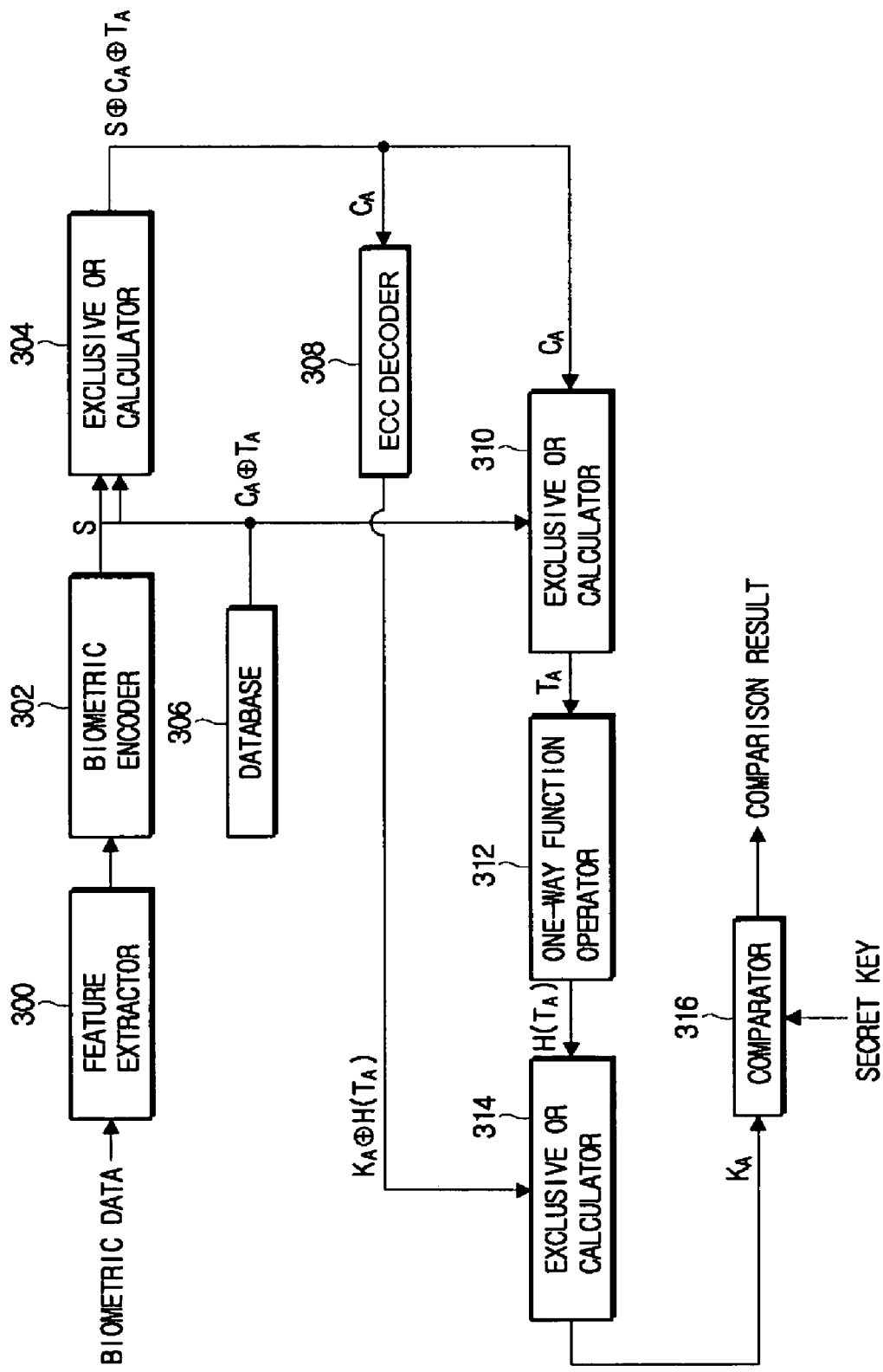
FIG. 3 is a block diagram explaining the authentication with respect to the provided biometric data according to an embodiment of the present invention.

FIG. 3 illustrates components of an authentication system that perform the user authentication using the input biometric data of the user according to an embodiment of the present invention. The authentication system includes a feature extractor 300, a biometric encoder 302, an exclusive OR calculator 304, a database 306, an ECC decoder 308, an exclusive OR calculator 310, a one-way function operator 312, an exclusive OR calculator 314, and a comparator 316. The above construction for the user authentication may include other components, but only the required components used in the specific example set forth in FIG. 3 are illustrated in FIG. 3 for the sake of brevity. However, it is understood that one of the elements of FIG. 3 can be combined and/or not used. For instance, the feature extractor 300 can be remotely located and/or the extracted biometric data and be supplied across a network or as files on a computer readable medium. Further, If the extracted biometric and/or the biometric data are supplied in digitized form, the biometric encoder 302 need not be included or need only compress/decompress the supplied data. Also, the database 306 can be remotely located on a medium outside of the shown system and supply the stored data to the system across a network. Lastly, it is further understood that the database 306 can be stored using media of different types, including, but not limited to magnetic and/or optical type media.

The feature extractor 300 receives biometric data of a user detected using an appropriate detector. The feature extractor 300 extracts only features required for the biometric authentication from the received biometric data. The biometric encoder 302 encodes the received biometric data. In other words, the biometric encoder 302 encodes the received biometric data to digital data. In FIG. 3, S indicates the encoded biometric data at the biometric encoder 302. The biometric encoder 302 provides the encoded biometric data to the exclusive OR calculator 304. The database 306, which stores biometric data of the authenticated users, provides $C_A \oplus T_A$ to the exclusive OR calculators 304 and 310.

The exclusive OR calculator 304 performs the exclusive OR operation to the received S and $C_A \oplus T_A$. The exclusive OR calculator 304 outputs $S \oplus C_A \oplus T_A$ as shown in FIG. 3. If the biometric data input from the feature extractor 300 is the biometric data of the authenticated user, the exclusive OR calculator 304 outputs the $C_A$. That is, if the S and $T_A$ match, the exclusive OR calculator 304 outputs the $C_A$. Otherwise, the $C_A$ is not output. The following explains the case when the exclusive OR calculator 304 outputs the $C_A$.

The ECC decoder 308 decodes the received $C_A$. As set forth above in relation to FIG. 2, the ECC process allows the detection and/or correction of an error from the input data with a fixed amount of the redundancy. After the decoding, the ECC decoder 308 outputs $K_A \oplus H(T_A)$. $K_A \oplus H(T_A)$ from the ECC decoder 308 is fed to the exclusive OR calculator 314. In addition, the $C_A$ from the exclusive OR calculator 304 is fed to the exclusive OR calculator 310. The exclusive OR calculator 310 conducts the exclusive OR operation to the $C_A \oplus T_A$ input from the database 306 and the $C_A$ input from the exclusive OR calculator 304. In result, the exclusive OR calculator 310 outputs $T_A$.

The one-way function operator 312 applies the one-way function to the $T_A$ input from the exclusive OR calculator 310. In further detail, the one-way function operator 312 generates $H(T_A)$ by applying the one-way function to the $T_A$ and supplies the generated $H(T_A)$ to the exclusive OR calculator 314. The exclusive OR calculator 314 applies the exclusive OR operation to $K_A \oplus H(T_A)$ input from the ECC decoder 308 and $H(T_A)$ input from the one-way function operator 312. In result, the exclusive OR calculator 314 outputs $K_A$.

The comparator 316 compares whether the $K_A$ provided from the exclusive OR calculator 314 is stored in the secret key storage. If the $K_A$ is stored in the secret key storage, the verification of the biometric data input from the feature extractor 300 is completed and the user is authenticated. Otherwise, the user is not authenticated.

It is to be understood that the exclusive OR calculator 304 does not output the $C_A$ when the database 306 does not store data corresponding to the biometric data of the feature extractor 300. If the exclusive OR calculator 304 does not output the $C_A$, the exclusive OR operator 314 does not output the $K_A$, either, thereby providing an additional layer of authentication.

While not required, it is understood that aspects of the present invention can be implemented as computer software encoded on at least one computer readable medium for use with one or more computers and/or processors. Further, while not required, it is understood that the systems shown separately in FIGS. 2 and 3 can be combined to form a system which both stores and verifies biometric data. In such a combined system, it is understood, but not required, that redundant elements common to both the systems can be combined to reduce the total number of elements used.

In light of the foregoing as set forth, rather than to store the biometric data in the database, the one-way function is applied to the biometric data and the processed biometric data is stored in the database. Therefore, the processed biometric data can be securely stored against attacks of a third party.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed:

1. A method of storing biometric data in a device, comprising:
   encoding input biometric data to provide encoded biometric data;
   performing a one-way operation with respect to the encoded biometric data to obtain one-way operated biometric data;
   applying a first exclusive OR operation to the one-way operated biometric data and a selected secret key to obtain a first result;
   encoding the first result in an error correction code (ECC) encoder to provide an encoded first result;
   applying a second exclusive OR operation to the encoded first result and the encoded biometric data to provide a second result; and
   storing the second result of the second exclusive OR operation.

2. The method according to claim 1, further comprising extracting only a part of the input biometric data, wherein the encoding the input biometric data comprises encoding the extracted biometric data.

3. A device which stores biometric data, comprising:
   a biometric encoder to encode the biometric data to provide encoded biometric data;
   a one-way function operator to apply a one-way function operation with respect to the encoded biometric data to obtain one-way operated biometric data;
   a first exclusive OR calculator to perform an exclusive OR operation with respect to the one-way operated biometric data and a selected secret key to provide a first result;
   an error correction code (ECC) encoder to encode the first result to provide an encoded first result;
   a second exclusive OR calculator to perform an exclusive OR operation with respect to the encoded first result and the encoded biometric data to provide a second result; and
   a database to store the second result of the exclusive OR operation.

4. The device according to claim 3, further comprising a feature extractor to extract only a part of the input biometric data and provide the extracted biometric data to the biometric encoder.

5. An apparatus which verifies biometric data in an authentication device, comprising:
   a biometric encoder to encode the biometric data to be verified to provide encoded biometric data;
   a first exclusive OR calculator to perform an exclusive OR operation with respect to the encoded biometric data and stored data to provide a first result;
   a second exclusive OR calculator to perform an exclusive OR operation with respect to the stored data and the first result to provide a second result;
   an error correction code (ECC) decoder to decode the first result to provide a decoded first result;
   a one-way function operator to apply a one-way function to the second result to obtain a one-way operated second result;
   a third exclusive OR calculator to perform an exclusive OR operation with respect to the one-way operated second result and the decoded first result to provide a third result; and
   a comparator to determine whether the third result matches a stored secret key.

6. The apparatus according to claim 5, further comprising a feature extractor to extract only a part of the input biometric data and to provide the extracted biometric data to the biometric encoder.

7. A method of verifying biometric data in an authentication device, comprising:
   encoding biometric data to be verified to provide encoded biometric data;
   performing a first exclusive OR operation with respect to the encoded biometric data and stored data to provide a first result;
   performing a second exclusive OR operation with respect to the stored data and the first result to provide a second result;
   decoding the first result in an error correction code (ECC) decoder to provide a decoded first result;
   applying a one-way function to the second result to provide a one-way function applied second result;
   performing a third exclusive OR operation with respect to the one-way function applied second result and the decoded first result to provide a third result; and
   determining whether the third result matches a stored secret key.

8. The method according to claim 7, further comprising extracting a part of the input biometric data, wherein the encoding biometric data comprises encoding the extracted biometric data.

9. A method of encoding biometric data in a device for use in authentication, comprising:
   encoding input biometric data to provide encoded biometric data;
   performing a one-way operation with respect to the encoded biometric data to obtain one-way operated biometric data;
   applying a first exclusive OR operation on the one-way operated biometric data and a selected secret key to obtain a first result;
   encoding the first result in an error correction code (ECC) encoder to provide an encoded first result;
   applying a second exclusive OR operation on the encoded first result and the encoded biometric data to obtain a second result; and
   storing the second result for use in authentication in a database.

10. The method of claim 9, further comprising encoding received biometric data to obtain the input biometric data.

11. The method of claim 10, further comprising, prior to encoding the received biometric data, extracting selected features from input data such that the encoded biometric data includes only the extracted selected features.

12. At least one non-transitory computer readable medium encoded with processing instructions for implementing the method of claim 9 using at least one computer.

13. A device for encoding biometric data for use in authentication, comprising:
   a biometric encoder to encode the biometric data to be verified to provide encoded biometric data;
   a one-way function operator to apply a one-way function operation with respect to the encoded biometric data to obtain one-way operated biometric data;
   a first exclusive OR calculator to apply a first exclusive OR operation on the one-way operated biometric data and a selected secret key to obtain a first result;
   an encoder which encodes the first result in an error correction code (ECC) encoder to provide an encoded first result; and
   a second exclusive OR calculator to apply a second exclusive OR operation on the encoded first result and the biometric data to obtain a result to be used in authentication.

14. The device of claim 13, wherein the device sends the result to be used in authentication to be stored in a database.

* * * * *